(12) United States Patent
Aarts et al.

(10) Patent No.: US 6,961,928 B2
(45) Date of Patent: Nov. 1, 2005

(54) CO-ORDINATE INTERNAL TIMERS WITH DEBUGGER STOPPAGE

(75) Inventors: Thomas W. Aarts, Mantorville, MN (US); Thomas Hung Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 09/968,054

(22) Filed: Oct. 1, 2001

(65) Prior Publication Data

US 2003/0066054 A1  Apr. 3, 2003

(51) Int. Cl.[7] ................................................ G06F 9/44

(52) U.S. Cl. ...................... 717/131; 717/128; 717/129; 714/38

(58) Field of Search ............. 717/124–140; 714/30–39

(56) References Cited

U.S. PATENT DOCUMENTS

| | | | | |
|---|---|---|---|---|
| 5,930,470 A | * | 7/1999 | Noguchi et al. | 714/38 |
| 5,956,479 A | * | 9/1999 | McInerney et al. | 714/38 |
| 6,154,857 A | * | 11/2000 | Mann | 714/30 |
| 6,397,379 B1 | * | 5/2002 | Yates et al. | 717/140 |
| 6,681,384 B1 | * | 1/2004 | Bates et al. | 717/129 |
| 6,687,857 B1 | * | 2/2004 | Iwata et al. | 714/38 |

* cited by examiner

Primary Examiner—Ted T. Vo
Assistant Examiner—Chuck Kendall
(74) Attorney, Agent, or Firm—Moser, Patterson & Sheridan, LLP

(57) ABSTRACT

Methods, systems and articles of manufacture for software implemented timers configured to account for purposeful or desired program stoppage. Such program stoppage is a common occurrence in debugging environments. Because such program stoppage is not indicative of an error condition, it is undesirable to include the stoppage time with the elapsed timer value. Accordingly, a process counter is implemented which is incremented only while a process of the application being debugged is executing.

12 Claims, 4 Drawing Sheets

CO-ORDINATE INTERNAL TIMERS WITH DEBUGGER STOPPAGE

BACKGROUND OF THE INVENTION

1. Field of the Invention

The present invention generally relates to data processing. More particularly, embodiments are provided for program timers.

2. Description of the Related Art

Inherent in any software development technique is the potential for introducing "bugs". A bug will typically cause unexpected results during the execution of the program. Locating, analyzing, and correcting bugs in a computer program is a process known as "debugging." Debugging of programs may be done either manually or interactively by a debugging system mediated by a computer system. Manual debugging of a program requires a programmer to manually trace the logic flow of the program and the contents of memory elements, e.g., registers and variables. In the interactive debugging of programs, the program is executed under the control of a monitor program (known as a "debugger"). The debugger may be located on and executed by the same computer system on which the program is executed or may be located on a different system from the one the program is executed on, in the case of a distributed debugger.

Conventional debuggers typically support various operations to assist a computer programmer. Each operation allows the programmer to examine the state of program registers and variables at a given point in the execution of a program. A first operation supported by conventional debuggers is a breakpoint operation. A "breakpoint" is a point in the program where execution of the computer program is stopped so that the state of the program can be examined by a computer programmer. As a result, when a computer program is executed by a debugger, the program executes in a normal fashion until a breakpoint is reached. The debugger then stops execution and displays the results of the computer program to the programmer for analysis.

In some cases, the use of breakpoints (and other debugging tools which cause program stoppage) can result in problems with internal program timers, which are used to ensure proper operation and execution of the program. Such internal program timers are incremented according to a system clock. The system clock is itself updated by hardware and, as a result, continues to increment even while any individual process is halted (e.g., for debugging upon encountering a breakpoint).

The operation and associated problems of such a timing scheme may be illustrated with reference to FIG. 1. FIG. 1 shows an execution environment for illustrative system 100. The system 100 is executing a process 102 which includes a first function 104 and a second function 106. The functions 104, 106 may be executed within a common thread. The timing of the functions 104, 106 is checked by implementing an operating system timer 108 (referred to herein as the system timer) which is configured with a cache area 110 to store a start time. A hardware-based system clock 112 is utilized to increment the system timer 108 according to predefined units of time.

In operation, the first function 104 begins executing at step 120. At step 122, the first function 104 initiates the system timer 108 and stores the start time into the cache area 110. The system 100 is then configured to periodically query, at step 136, whether the system timer 108 has expired. If the system timer 108 has expired, the associated thread is then ended at step 138. Otherwise, processing proceeds to step 140 where no action is taken and the system timer 108 continues to increment.

The determination at step 136 is made using an expected timer wait value (or allowed run time), which may be user configurable. The expected timer wait value is the maximum time needed for the process 102 to complete execution assuming no errors are encountered. The expected timer wait value is then compared to an elapsed run time, which is the difference between the current system time (as defined by the system clock 112) and the start time contained in the cache area 110.

Once the system timer 108 is initiated, a call is made, at step 124, to the second function 106, which is entered at step 126. Illustratively, the second function 106 is configured with a breakpoint (which may have been set by a user at some earlier time) encountered at step 128. Accordingly, the process 102 and its related threads are halted upon encountering the breakpoint at step 128. The user is then free to inspect variables and engage in other debugging activities. Subsequently, the user inputs a command to the system causing the process 102 to resume execution. Assuming that the system timer 108 has not expired, execution of the second function 106 proceeds to step 130 from which processing returns to the first function 104. As indicated by step 132 of the first function 104, execution continues until step 134 where the system timer 108 is stopped.

If, however, the system timer 108 has expired when execution of the process 102 resumes, an error path code will be entered. This situation arises because the system timer 108 continues to be incremented even though the process 102 and its threads have been halted as a result of encountering the breakpoint at step 128. As a result, the calculated elapsed run time is erroneously inflated and is not indicative of the actual elapsed run time.

One solution to the foregoing problem is to change the timer values to account for possible program stoppage due to breakpoints. However, the solution is undesirable because the utility of the timer as an error indicator is undermined. In addition, it is necessary to recompile the program following a change to the timer values, thereby increasing the overhead associated with debugging.

Therefore, a need exists for timers adapted for use in environments where execution is periodically halted and restarted.

SUMMARY OF THE INVENTION

The present invention provides embodiments for software implemented timers configured to account for purposeful or desired program stoppage.

One embodiment provides a method of operating a program timer in a debugging environment comprising a debugger program and a debugee application. The method comprises executing a process of the debugee application; incrementing a process counter only while the process is executing; and periodically determining whether a predetermined elapsed time value has expired according to a current value of the process counter.

In another embodiment, a method comprises executing a process of a debugee application; determining a first elapsed time inclusive of stoppage of the process; determining whether the first elapsed time is at least as great as an allowed elapsed time value; if so, determining a second elapsed time exclusive of stoppage of the process; determining whether the second elapsed time is at least as great as the allowed elapsed time value; and if so, issuing an error message.

In still another embodiment, a computer readable medium is provided which contains a timing program which, when executed by a processor, performs operations for timing program execution in a debugging environment comprising a debugger program and a debugee application. The timing program comprises counter instructions for incrementing a process counter while a process of the debugee application is executing and halting incrementing of the process counter when control is given to the debugger; and expiration instructions for determining whether a timer value has expired according to at least a current value of the process counter, wherein the timer value is configured to time the execution of a thread of the process.

In yet another embodiment, a computer comprises a memory containing contents comprising a timing program, a debugger program, a debugee application and an operating system. A processor of the computer, when executing at least a portion of the contents, is configured to execute a process of the debugee application; execute a thread of the debugee application, wherein the thread is implemented by code to be debugged; execute a counter thread of the debugee application, wherein the counter thread implements a process counter incremented only while the process is executing; and periodically determine whether a predetermined elapsed time value has expired according to a current value of the process counter.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
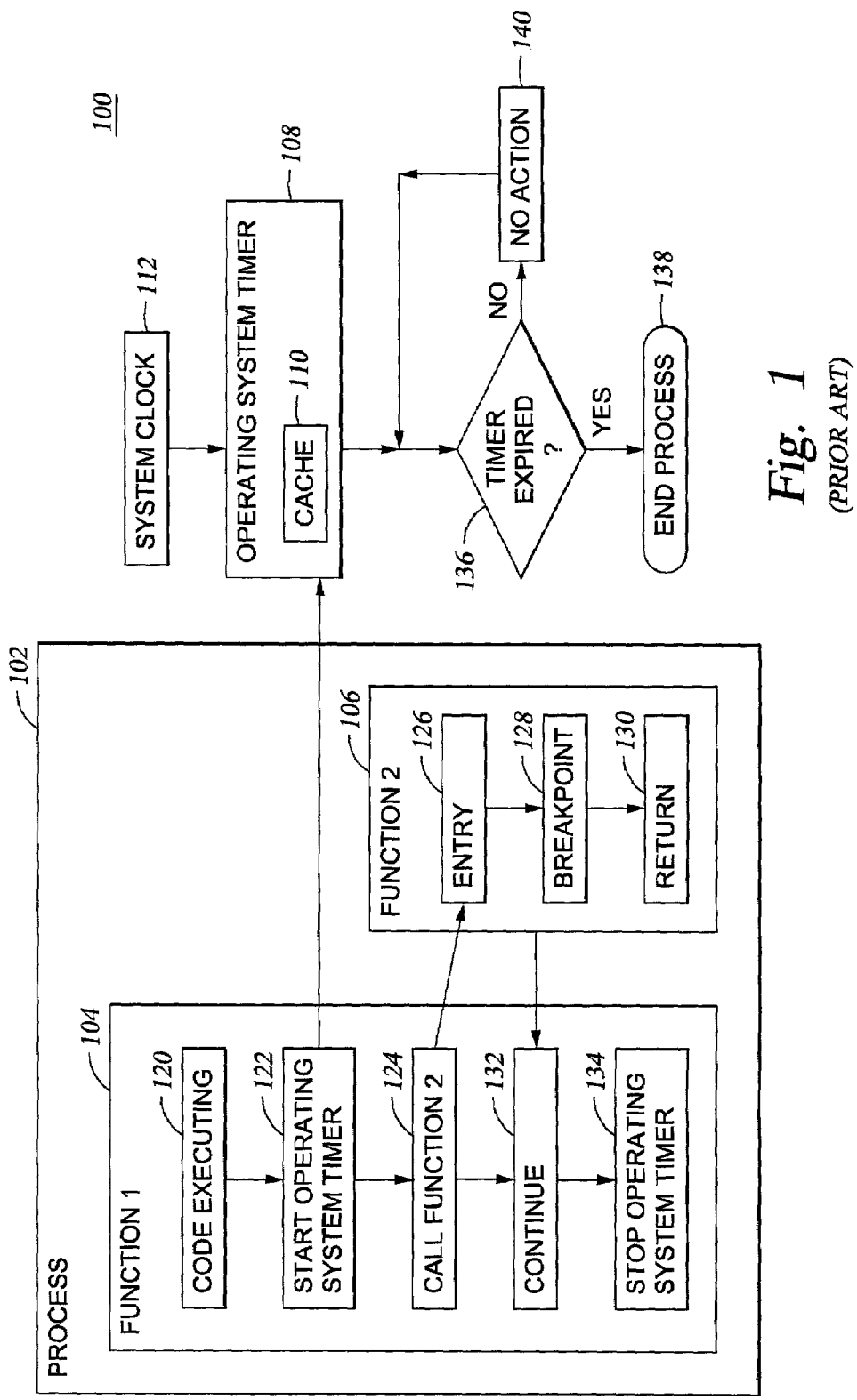
FIG. 1 is a flowchart illustrating the operation of a prior art timer in a debugging environment.

The present invention provides embodiments for software implemented timers configured to account for purposeful or desired program stoppage. Such program stoppage is a common occurrence in debugging environments. Because such program stoppage is not indicative of an error condition, it is undesirable to include the stoppage time with the elapsed timer value.

One embodiment of the invention is implemented as a program product for use with a computer system such as, for example, the computer system 210 shown in FIG. 2 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiments may also be practiced in distributed computing environments where tasks are performed by remote processing devices that are linked through a communications network. In a distributed computing environment, program modules may be located in both local and remote memory storage devices.

Figure 2:
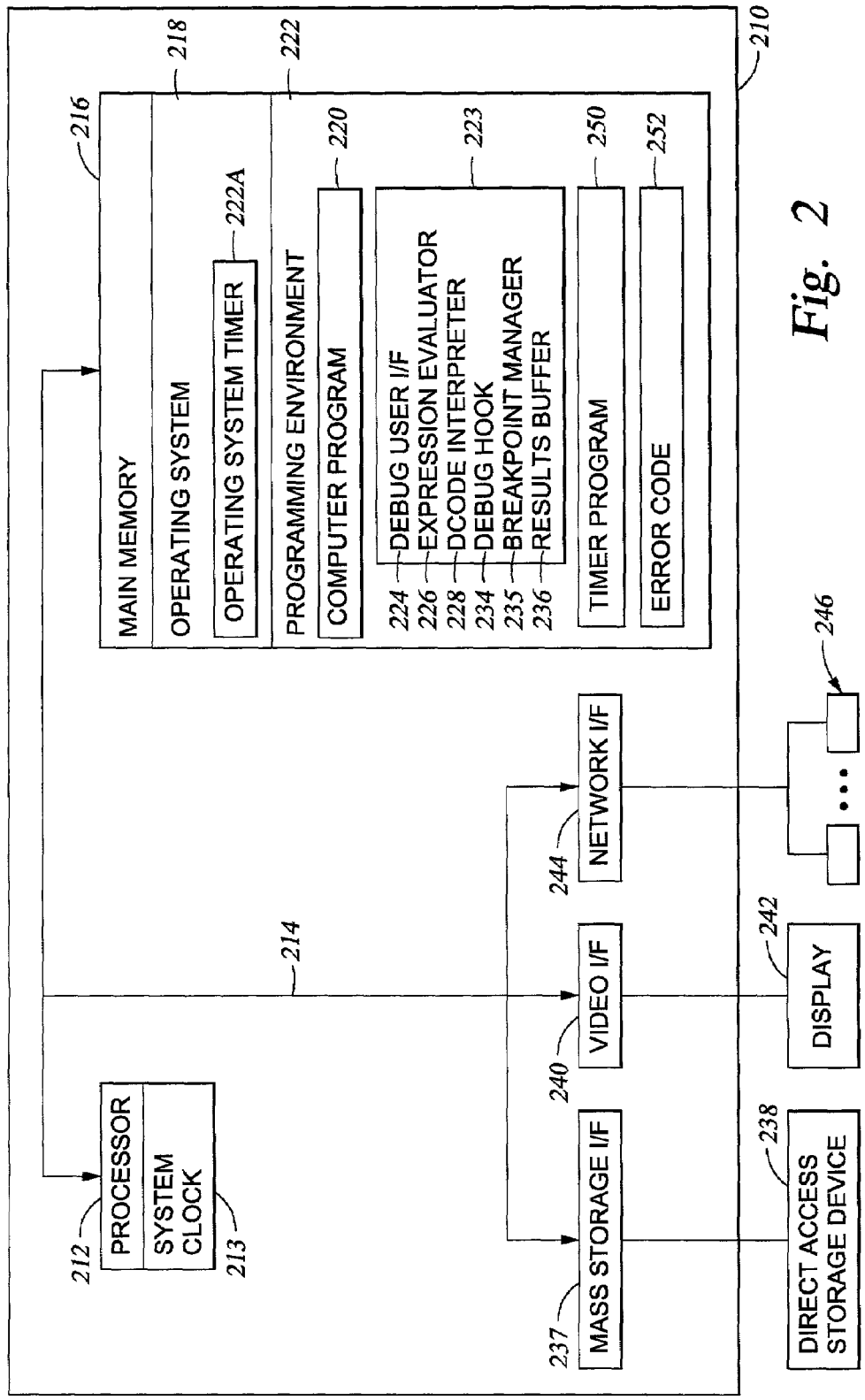
FIG. 2 is a high-level diagram of a computer system.

Referring now to FIG. 2, a computer system 210 consistent with the invention is shown. For purposes of the invention, computer system 210 may represent any type of computer, computer system or other programmable electronic device, including a client computer, a server computer, a portable computer, an embedded controller, etc. The computer system 210 may be a standalone device or networked into a larger system. In one embodiment, the computer system 210 is an eServer iSeries 400 computer available from International Business Machines Corporation of Armonk, N.Y.

The computer system 210 could include a number of operators and peripheral systems as shown, for example, by a mass storage interface 237 operably connected to a direct access storage device 238, by a video interface 240 operably connected to a display 242, and by a network interface 244 operably connected to a plurality of networked devices 246. The display 242 may be any video output device for outputting a user interface. The networked devices 246 could be desktop or PC-based computers, workstations, network terminals, or other networked computer systems.

Computer system 210 is shown for a programming environment that includes at least one processor 212, which obtains instructions, or operation codes, (also known as opcodes), and data via a bus 214 from a main memory 216. The processor 212 can be any processor adapted to support the debugging methods, apparatus and article of manufacture of the invention. In addition, the processor 212 is configured with a system clock 213. Illustratively, the processor is a PowerPC available from International Business Machines Corporation of Armonk, N.Y.

The main memory 216 could be one or a combination of memory devices, including Random Access Memory, nonvolatile or backup memory, (e.g., programmable or Flash memories, read-only memories, etc.). In addition, memory 216 may be considered to include memory physically located elsewhere in a computer system 210, for example, any storage capacity used as virtual memory or stored on a mass storage device or on another computer coupled to the computer system 210 via bus 214.

The main memory 216 generally includes an operating system 218 and a programming environment 222. The operating system 218 is configured with an operating system timer 222A which is incremented by the system clock 213. The programming environment 222 comprises a computer program 220 (also referred to herein as a "debugee"), a debugger program 223, a timer program 250 and an error code segment 252. In one embodiment, the debugger 223 is a VisualAge for C++ for OS/400 debugger. VisualAge for C++ for OS/400 is available from International Business Machines Corporation of Armonk, N.Y.

Although the software constructs, such as the computer program 220 and the debugger 223, are shown residing on the same computer, a distributed environment is also contemplated. Thus, for example, the debugger 223 may be located on a networked device 246, while the computer program 220 to be debugged is on the computer system 210.

In a specific embodiment, the debugger 223 comprises a debugger user interface 224, expression evaluator 226, Dcode interpreter 228 (also referred to herein as the debug interpreter 228), debugger hook 234, a breakpoint manager 235 and a results buffer 236. Although treated herein as integral parts of the debugger 223, one or more of the foregoing components may exist separately in the computer system 210. Further, the debugger may include additional components not shown. Also, some components may be combined. For example, the timer program 250 may be a component of the operating system 222.

A debugging process is initiated by the debug user interface 224. The user interface 224 presents the program under debugging and highlights the current line of the program on which a stop or error occurs. The user interface 224 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross referenced.

The expression evaluator 226 parses the debugger command passed from the user interface 224 and uses a data structure (e.g., a table) generated by a compiler to map the line number in the debugger command to the physical memory address in memory 216. In addition, the expression evaluator 226 generates a Dcode program for the command. The Dcode program is machine executable language that emulates the commands. Some embodiments of the invention include Dcodes which, when executed, activate control features described in more detail below.

The Dcode generated by the expression evaluator 226 is executed by the Dcode interpreter 228. The interpreter 228 handles expressions and Dcode instructions to perform various debugging steps. Results from Dcode interpreter 228 are returned to the user interface 224 through the expression evaluator 226. In addition, the Dcode interpreter 228 passes on information to the debug hook 234, which takes steps described below.

After the commands are entered, the user provides an input that resumes execution of the program 220. During execution, control is returned to the debugger 223 via the debug hook 234. The debug hook 234 is a code segment that returns control to the appropriate user interface. In some implementations, execution of the program eventually results in an event causing a trap to fire (e.g., a breakpoint is encountered). Control is then returned to the debugger by the debug hook 234 and program execution is halted. The debug hook 234 then invokes the debug user interface 224 and may pass the results to the user interface 224. Alternatively, the results may be passed to the results buffer 236 to cache data for the user interface 224. In other embodiments, the user may input a command while the program is stopped, causing the debugger to run a desired debugging routine. Result values are then provided to the user via the user interface 224.

Figure 3:
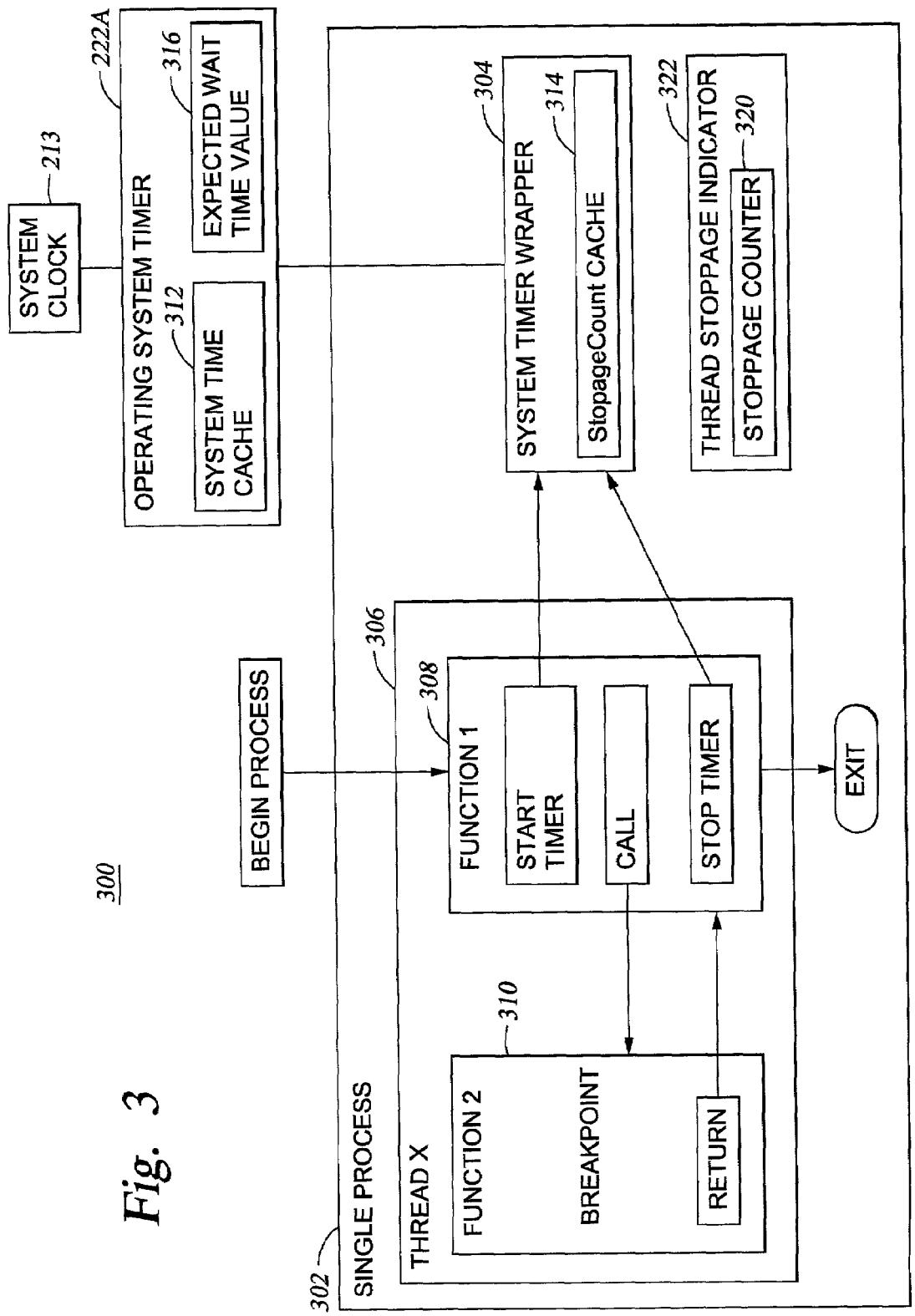
FIG. 3 is an execution environment of the computer system of FIG. 2.

FIG. 3 shows an execution environment 300 of the system 200. In general, the execution environment includes the operating system timer 222A and a process 302, which is an instance of the executing computer program 220. The operating system timer 222A operates to determine whether a maximum allowable elapsed time has expired, at which time an error code segment 252 (FIG. 2) is executed to notify a user of a possible error. To this end, the operating system timer 222A is configured with a system time cache 312 and an expected wait time value 316. The system time cache 312 is populated with a value received from the system clock 213 the process 302. The expected wait time value 316 is the maximum allowed run time for the process 302 assuming that no errors are encountered.

Illustratively, the process 302 implements a thread 306 which executes code being debugged by the debugger 223. The thread 306 comprises a first function 308 and a second function 310, wherein the second function 310 is called from the first function 308 and contains a breakpoint. The first function 308 is also configured to start and stop a system timer wrapper 304, which is implemented by the timer program 250. The system timer wrapper 304 is configured with a stoppage count cache 314 which is populated with a value received from a stoppage counter 320 implemented by a stoppage indicator thread 322 of the process 302. The stoppage indicator thread 322 is running in high priority and, by virtue of being implemented by the process 302, will only increment the stoppage counter 320 while the process 302 is running. As a result, the stoppage counter 320 represents the logical number of units of time that the process 302 was executing normally, and does not include any units of time while the process 302 was stopped by the debugger 223.

Figure 4:
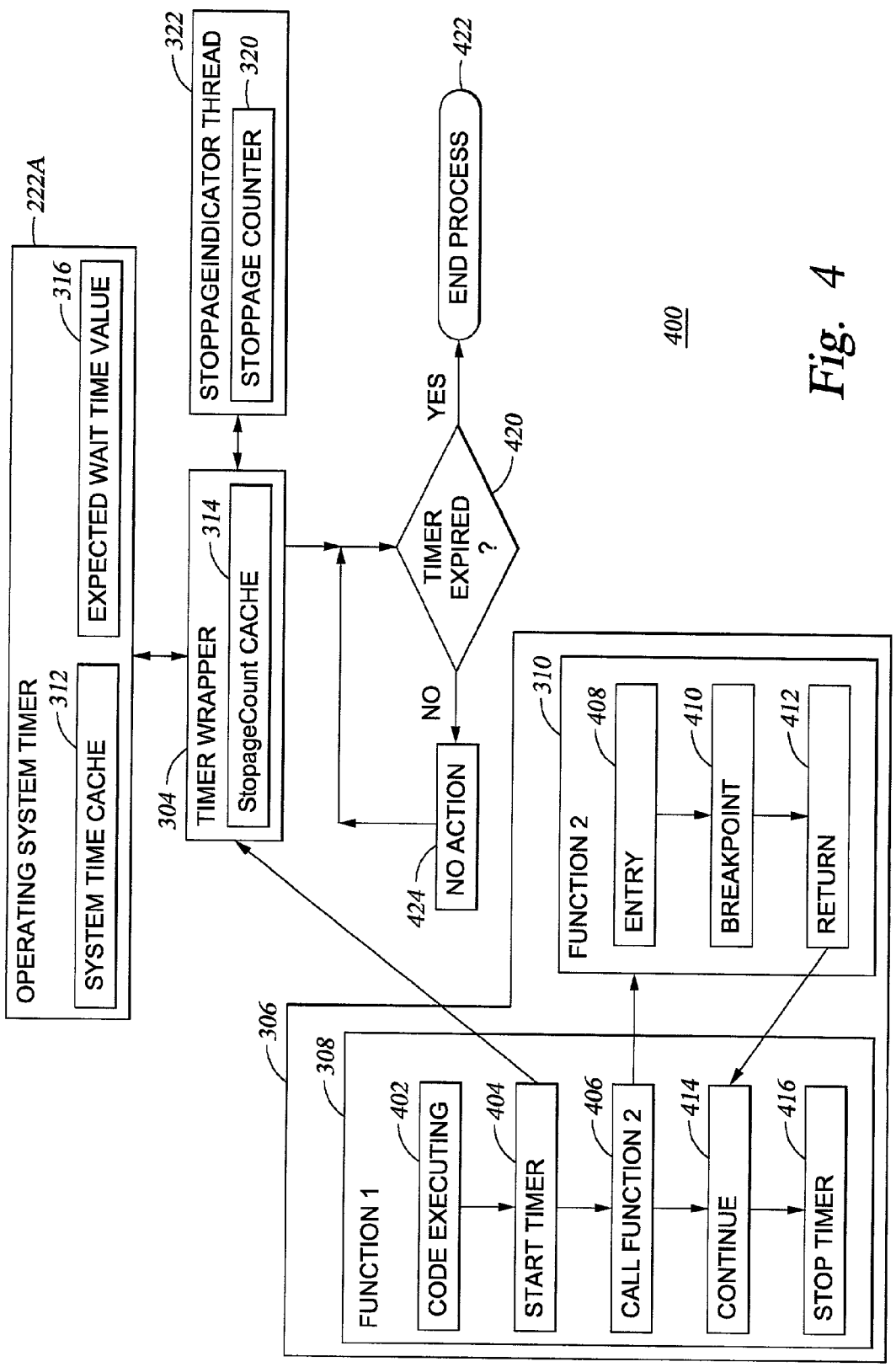
FIG. 4 is a flowchart illustrating the operation of a timer in a debugging environment.

Referring now to FIG. 4, a method 400 for implementing the timer program 250 is shown. Specifically, the method 400 shows events occurring during execution of the process 302. Initially, the process 302 begins and implements the thread 306 and the stoppage indicator thread 322. Accordingly, at step 402, the thread 306 begins executing. At step 404, the system timer wrapper 304 is initiated, whereby the current value of the stoppage counter 320 is cached in a stoppage count cache 314. The system timer wrapper 304 then takes steps to initiate the operating system timer 222A which caches the current system time in the system time cache 312. The operation of the system timer 222 and timer wrapper 304 will be described in more detail below.

Assuming normal operations with no expiration of timers, the method 400 proceeds to step 406 where the first function 308 calls the second function 310. The second function 310 is entered at step 408 and then encounters a breakpoint at step 410, whereby execution of the process 302 (as well as its threads 306 and 322) is halted. The user is then free to inspect variables and engage in other debugging activities. During this time, the stoppage counter 320 is not incremented, while the operating system timer 222A continues to increment. Subsequently, the user inputs a command to the system causing the process 302 to resumes execution. At this point, the stoppage indicator thread 322 resumes execution so that the stoppage counter 320 is again incremented. As indicated by step 412, the second function 310 returns to the first function 308, which continues execution at step 414. The first function 308 continues execution until step 416 where the operating system timer 222A and the stoppage indicator thread 322 are halted.

Returning now to step 404, once the operating system timer 222A and the stoppage indicator thread 322 are initiated, the process 302 is later notified by the operating system 118 when the expected wait time value 316 has been reached or exceeded. Thus, an initial determination is made as to whether the operating system timer 222A has expired. This is done by comparing the difference between the current system time (as defined by the system clock 213) and the cached value contained in the system time cache 312 with the expected wait time value 316. If the calculated difference does not exceed the expected wait time value 316, the operating system timer 222A has not expired and no further action is taken. On the other hand, if the calculated difference does exceed the expected wait time value 316, the operating system timer 222A has expired. However, because the operating system timer 222A does not account for stoppage of the process 302, additional validation is necessary. Such additional validation is implemented by the query 420 which determines whether the process 302 has expired. If the query 420 is answered affirmatively, the process 302 is ended at step 422. If the query 420 is answered negatively, the process 302 is allowed to continue. To resolve the query 420, the cached value of the stoppage counter cache 314 is compared to the current value of the stoppage counter 320. If the difference between these values is less than the expected wait time value 316, then no action is taken (step 424) and the process 302 is allowed to continue. If, however, the difference between these values is equal to or greater than the expected wait time value 316, then processing proceeds to step 422 to end the process 302 and call the error code 252.

If step 424 is answered negatively, the stoppage counter cache 314 may be reset to the current value obtained from the stoppage counter 320 and the system time cache 312 is set to the current system time value. This results in the total expected wait time value 316 being in effect again. Alternatively, it may be desirable to adjust the expected wait time value 316 according to what logical portion of the expected wait time value 316 has already expired. For example, assume that the expected wait time value is 10 seconds and that the elapsed system time (as calculated by the operating system timer 222A) is 10 seconds. Accordingly, the operating system timer 222A has expired. Assume further that the difference between the current value of the stoppage counter 320 and the cached stoppage counter value (contained in the stoppage counter cache 314) is 5 seconds (referred to herein as the "elapsed logical time"). Accordingly, the process 302 has not exceeded the expected wait time value 316. In this case, the system time cache 312 is reset with the current system time (given by the system timer 213), the stoppage counter cache 314 is reset with the current value give by the stoppage counter 320 and the expected wait time value 316 is adjusted to the remaining portion of its original value. The adjusted expected wait time value is given by Equation 1.

$$(\text{original expected wait time value}) - (\text{elapsed logical time}) = \text{adjusted expected wait time value.} \quad \text{Equation 1}$$

As noted above, the elapsed logical time is the difference between the current value of the stoppage counter 320 and the value of the stoppage counter cache 314. Thus, Equation 1 may be rewritten as:

$$(\text{original expected wait time value}) - ((\text{current value of the stoppage counter 320}) - (\text{value of the stoppage counter cache 314})) = \text{adjusted expected wait time value.} \quad \text{Equation 2}$$

Substituting with the values of the current example, Equations 1 and 2 become Equation 3.

$$(10) - (5 - 0) = 5, \text{ assuming that this calculation is being performed for the first time since the timers were started at step 404 (which is why the stoppage counter cache 314 equals zero).} \quad \text{Equation 3}$$

Accordingly, the expected wait time value 316 is set to 5 seconds. Additionally, the counter cache 314 is set to 5 (the value of stoppage counter 320 when query 420 was performed) and the stoppage counter 320 is allowed to continue running from its current value (in the present example, from 5 seconds). Note that where the expected wait time 316 is adjusted in this manner the need for the stoppage counter cache 314 can be eliminated if the stoppage counter 320 is reset to zero. In this case, the value of the stoppage counter 320 is always equal to the logical expired time to be compared to the expected wait time 316. However, it is generally preferred to utilize a stoppage counter cache 314 so that multiple threads may use a single instance of the stoppage counter 320 to advantage.

While the foregoing is directed to embodiments of the present invention, other and further embodiments of the invention may be devised without departing from the basic scope thereof, and the scope thereof is determined by the claims that follow.

What is claimed is:

1. A method of operating a program timer in a debugging environment comprising a debugger program and a debugee application being debugged by the debugger program, the method comprising:
   executing a process of the debugee application;
   determining a first elapsed time inclusive of stoppage of the process:
   determining whether the first elapsed time is at least as great as an allowed elapsed time value by determining a first difference between a current value of an operating system timer and a cached process execution start time value indicative of a process execution start time;
   if so determining a second elapsed time exclusive of stoppage of the process: determining whether the second elapsed time is at least as great as the allowed elapsed time value and
   if so, issuing an error message.

2. The method of claim 1, wherein determining the second elapsed time comprises:
   determining a second difference between a current value of a process counter and a cached process counter value indicative of the process execution start time.

3. The method of claim 2, wherein the process counter is incremented by a counter thread implemented by the process.

4. A method of operating a program timer in a debugging environment comprising a debugger program and a debugee application, being debugged by the debugger program, the method comprising: executing a process of the debugee application; determining a first elapsed time:
   inclusive of stoppage of the process;
   determining whether the first elapsed time is at least as great as an allowed elapsed time value by determining a first difference between a current value of an operating system timer and a cached process execution start time value indicative of a process execution start time;
   if so, determining a second elapsed time exclusive of stoppage of the process; determining whether the second elapsed time is at least as great as the allowed elapsed time value; and
   if so, issuing an error message.

5. The method of claim 4, wherein determining the second elapsed time comprises: determining a second difference between a current value of a process counter and a cached process counter value indicative of the process execution start time.

6. The method of claim 5, wherein the process counter is incremented by a counter thread implemented by the process.

7. A computer readable storage medium containing a timing program which, when executed by a processor, performs an operations for timing program execution in a debugging environment comprising a debugger program and a debugee application being debugged by the debugger program; the operation, comprising: executing a process of the debugee application; determining a first elapsed time inclusive of stoppage of the process; determining whether the first elapsed time is at least as great as an allowed elapsed time value by determining a first difference between a current value of an operating system timer and a cached process execution start time value indicative of a process execution start time; if so, determining a second elapsed time exclusive of stoppage of the process; determining whether the second elapsed time is at least as great as the allowed elapsed time value; and if so, issuing an error message.

8. The computer readable storage medium of claim 7, wherein determining the second elapsed time comprises: determining a second difference between a current value of a process counter and a cached process counter value indicative of the process execution start time.

9. The computer readable storage medium of claim 8, wherein the process counter is incremented by a counter thread implemented by the process.

10. A computer, comprising: a memory containing contents comprising a timing program, a debugger program, a debugee application and an operating system having an associated operating system timer; and a processor which, when executing at least a portion of the contents, is configured to: execute a process of the debugee application; determine a first elapsed time inclusive of stoppage of the process; determine whether the first elapsed time is at least as great as an allowed elapsed time value by determining a first difference between a current value of the operating system timer and a cached process execution start time value indicative of a process execution start time; if so, determine a second elapsed time exclusive of stoppage of the process; determine whether the second elapsed time is at least as great as the allowed elapsed time value; and if so, issuing an error message.

11. The computer readable storage medium of claim 10, wherein determining the second elapsed time comprises: determining a second difference between a current value of a process counter and a cached process counter value indicative of the process execution start time.

12. The computer readable storage medium of claim 11, wherein the process counter is incremented by a counter thread implemented by the process.

* * * * *